Dec. 26, 1967     A. SURBER ETAL     3,360,237
WATER TURBINE COVER
Filed July 18, 1966
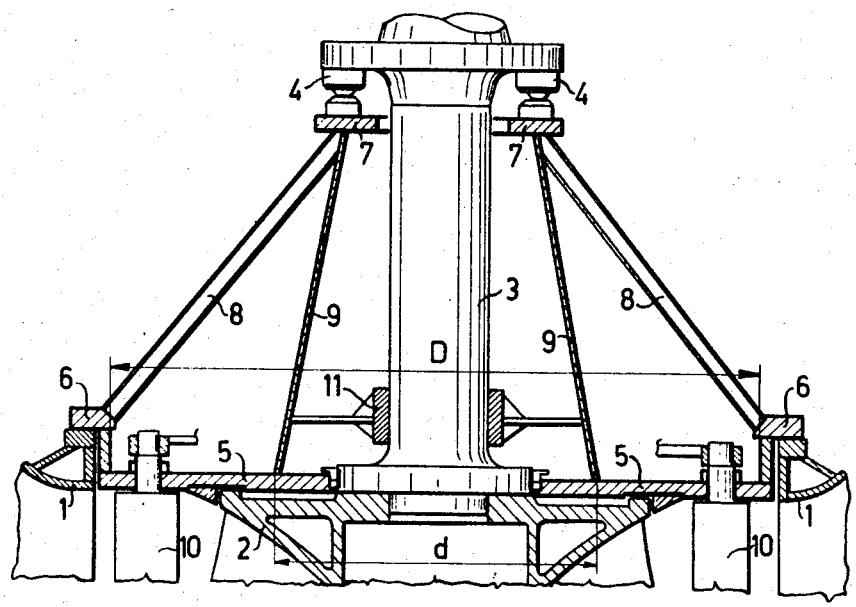
INVENTORS
Albert Surber
Helmut Pirchl
BY    *Dodge and Son*
ATTORNEYS

United States Patent Office 3,360,237
Patented Dec. 26, 1967

3,360,237
WATER TURBINE COVER
Albert Surber, Zurich, and Helmut Pirchl, Mutschellen, Switzerland, assignors to Escher Wyss Aktiengesellschaft, Zurich, Switzerland, a corporation of Switzerland
Filed July 18, 1966, Ser. No. 565,992
Claims priority, application Switzerland, Sept. 17, 1965, 12,915/65
3 Claims. (Cl. 253—26)

ABSTRACT OF THE DISCLOSURE

A cover of a vertical axis water turbine comprises an annular flat plate facing the flow chamber and provided at its outer edge with a flange to be fixed to the stay ring of the turbine, an annular bearing bracket arranged co-axially with the turbine axis at a distance above said plate for supporting the thrust bearing of the turbine, and two bracings arranged coaxially with the turbine axis, namely an outer bracing which connects the bearing bracket to the flange and an inner bracing which connects the bearing bracket to the annular flat plate at points situated midway between the flange and the turbine axis.

---

This invention relates to a cover of a vertical axis water turbine, more particularly a Francis turbine, which cover has an annular closure part facing the flow chamber and provided on its outer edge with a flange for fixing it to the stay ring of the turbine, an annular bearing bracket arranged co-axially with the turbine axis at a distance above said closure part for supporting the thrust bearing of the turbine, and two bracings arranged co-axially with the turbine axis and issuing from the bearing bracket, of which bracings, the outer one connects the bearing bracket to the flange, and the inner one connects the bearing bracket to the closure part.

In such a turbine cover, the load of the bearing bracket is principally transmitted by the outer bracing to the flange of the closure part and thence to the stay ring. In a known turbine cover of this kind, the outer bracing consists of individual supports, inclined at the same angle to the turbine axis and distributed over the periphery of the turbine cover. The closure part of this known turbine cover is constructed as a rotationally symmetrical shell with a convex meridian adapted to the course of the water flow, and the inner bracing consists of a cylindrical tube, which terminates at the inner edge of the closure part. Convex closure parts are, however, difficult to make and are expensive.

The aim of the invention is to simplify and cheapen the construction. It consists in that the closure part is constructed as a flat annular plate, and the inner bracing terminates on the annular plate at a distance from the inner edge of the annular plate on a circle, the diameter of which is substantially half the flange diameter.

An axial section through an embodiment example of the water turbine cover according to the invention as fitted is shown in the drawing.

The stay ring of a vertical axis Francis turbine is shown at 1, the runner at 2, the shaft at 3 and the thrust bearing at 4. The cover comprises substantially a closure part 5, constructed as a flat annular plate and provided on its outer edge with a flange 6 for attachment to the stay ring 1. An annular bearing bracket 7 for carrying the thrust bearing 4, which bearing bracket is also constructed as a flat annular plate is arranged co-axially with the turbine axis at a distance above the closure part 5. An outer bracing 8 co-axial with the turbine axis, issues from the bearing bracket 7 and consists of individual supports, uniformly distributed over the cover periphery and connecting the bearing bracket 7 to the flange 6. Only two of said supports are shown in the drawing. An inner bracing 9, likewise co-axial with the turbine axis, issues from the bearing bracket 7 and connects the said bearing bracket to the closure part 5, which inner bracing is constructed in the form of a frusto-conical shell, flaring toward the annular plate and terminating at a distance from the inner edge of the annular plate forming the closure part 5 on a circle, the diameter $d$ of which is about half the flange diameter $D$, on said annular plate. The bracings 9 and 8 are preferably connected to the bearing bracket 7 and to the closure part 5 or its flange 6 by welding, but could also be connected to these parts by any other means. At 10 are shown rotatable guide blades inserted in the closure part 5, and at 11 a guide bearing for the shaft 3, said bearing being carried by the bracing 9.

With the turbine empty, the load taken by the bearing bracket 7 is mainly transmitted through the bracing 8 to the flange 6 and thence to the stay ring 1. The flat annular plate, stressed for bending and forming the closure part 5 is comparatively flexible and practically does not take up any load from the bracing 9.

If, on the contrary, the turbine is under the pressure of the operating water, the closure part 5 is subjected by said water to an upward pressure. This is taken up partly by the flange 6, and for the other part is transmitted to the bracing 9. The described position of the connection of the bracing 9 to the closure part 5, which position is to include substantially the range $0.4D$ to $0.6D$, makes it possible to manage with minimum bending stressing of the closure part 5. The part of the load due to the water pressure and taken up by the bracing 9 is transmitted to the bearing bracket 7, so that the bracing 8 is now relieved of load or, if the water pressure is high enough, said bracing is even subjected to tensile stress.

Without departing from the scope of the invention, both bracings 8 and 9 may be constructed as conical shells or may consist of individual supports, or the outer bracing 8 may be constructed as a conical shell, and the inner bracing 9 may consist of individual supports.

If necessary, the closure part 5, constructed as a flat annular plate, may be provided with radial reinforcing ribs on its upper face.

What is claimed is:

1. In a vertical axis water turbine having a stay ring, a vertical shaft and a thrust bearing for supporting said shaft: a turbine cover comprising a closure part consisting of a flat annular plate arranged coaxially with said shaft and having an outer edge provided with an annular flange adapted to be fixed to said stay ring, and an inner edge; an annular bearing bracket for supporting said thrust bearing, arranged coaxially with said shaft at a distance above said closure part; and two bracings for connecting said thrust bearing bracket with said closure part, issuing from said thrust bearing bracket and arranged co-axially with said turbine shaft; one of said bracings terminating at said flange and the other bracing terminating on said annular plate at a distance from said inner edge on a circle, the diameter of which is substantially half the flange diameter.

2. The combination defined in claim 1 in which the inner bracing is formed as a frusto-conical shell flaring toward the annular plate.

3. The combination defined in claim 1 in which the outer bracing consists of an annular series of individual supports inclined at the same angle to the turbine axis.

(References on following page)

References Cited

UNITED STATES PATENTS

| | | | |
|---|---|---|---|
| 169,165 | 10/1875 | Haag | 253—122 |
| 1,604,362 | 10/1926 | Moody | 253—121 |
| 3,086,473 | 4/1963 | Miloradovitch | 253—26 X |

FOREIGN PATENTS

| | | |
|---|---|---|
| 1,154,345 | 10/1957 | France. |
| 1,167,673 | 8/1958 | France. |
| 1,066,510 | 10/1959 | Germany. |

EVERETTE A. POWELL, JR., *Primary Examiner.*